(12) United States Patent
Yamanaka (10) Patent No.: US 7,675,602 B2
(45) Date of Patent: Mar. 9, 2010

(54) BOARD DEVICE AND METHOD FOR MANUFACTURING DISPLAY ELEMENT

(75) Inventor: Satoru Yamanaka, Fukaya (JP)

(73) Assignee: Toshiba Matsushita Display Technology Co., Ltd., Tokyo (JP)

(*) Notice: Subject to any disclaimer, the term of this patent is extended or adjusted under 35 U.S.C. 154(b) by 313 days.

(21) Appl. No.: 11/812,605

(22) Filed: Jun. 20, 2007

(65) Prior Publication Data
US 2007/0296905 A1    Dec. 27, 2007

(30) Foreign Application Priority Data
Jun. 21, 2006    (JP)    ............... 2006-171063

(51) Int. Cl.
*G02F 1/1333*    (2006.01)
(52) U.S. Cl. ...................... 349/152; 349/156
(58) Field of Classification Search ............... 349/152, 349/156, 153
See application file for complete search history.

(56) References Cited

U.S. PATENT DOCUMENTS

| | | | | |
|---|---|---|---|---|
| 2003/0080673 | A1* | 5/2003 | Ando ........................... | 313/495 |
| 2005/0046783 | A1 | 3/2005 | Kawata et al. | |
| 2007/0132933 | A1* | 6/2007 | Lee et al. .................... | 349/153 |
| 2008/0094563 | A1* | 4/2008 | Lee .......................... | 349/153 |

FOREIGN PATENT DOCUMENTS

| | | | |
|---|---|---|---|
| JP | 2002-250912 | | 9/2002 |
| JP | 02005241988 A | * | 9/2005 |
| KR | 2003-58616 A | | 7/2003 |
| KR | 2006-65167 A | | 6/2006 |

OTHER PUBLICATIONS

Notification of Reasons for Refusal Dated Dec. 17, 2007 issued by the Korean Patent Office in a Counterpart Application No. 10-2007-12417.

* cited by examiner

*Primary Examiner*—Akm E Ullah
(74) *Attorney, Agent, or Firm*—Finnegan, Henderson, Farabow, Garrett & Dunner, L.L.P.

(57) ABSTRACT

A pillar-shaped spacer is disposed at the position between the boundary line of adjacent liquid crystal cells and an OLB terminal so as to face the end portion of the OLB terminal and so as to be interposed between a first large-size substrate and a second large-size substrate. Even when the respective liquid crystal cells are separated from one another along the boundary lines of the adjacent liquid crystal cells, exfoliation of the OLB terminals is prevented by the pillar-shaped spacers, so that extra cutting margins between the adjacent liquid crystal cells can be reduced and the manufacturing performance and the built-in number of the liquid crystal cells can be enhanced.

8 Claims, 6 Drawing Sheets

BOARD DEVICE AND METHOD FOR MANUFACTURING DISPLAY ELEMENT

INCORPORATION BY REFERENCE

The present application claims priority under 35 U.S.C. § 119 to Japanese Patent Application No. 2006-171063 filed on Jun. 21, 2006. The content of the application is incorporated herein by reference in its entirety.

FIELD OF THE INVENTION

The present invention relates to a board device in which a plurality of adjacent display elements are segmented, and a method for manufacturing a display element.

BACKGROUND OF THE INVENTION

A liquid crystal cell as a display element used for a liquid crystal panel as a liquid crystal display element has been conventionally formed by interposing a liquid crystal layer between a pair of glass substrates.

In such a liquid crystal cell, a plurality of pixels are formed in a matrix form in a rectangular display area, and a non-display area is formed at the outside of the display area. A driver IC for driving thin film transistors (TFT) as switching elements for driving the pixels is mounted in the non-display area. The driver IC is electrically and mechanically connected to a flexible board having flexibility for various kinds of circuits formed thereon by so-called Outer Lead Bonding (OLB). Therefore, a plurality of OLB terminals as connecting terminal pads are juxtaposed with one another at the outside of the display area at the liquid crystal cell side, and the OLB terminals are formed in the non-display area so as to face the outside of the liquid crystal panel.

Such liquid crystal cells are manufactured by disposing a pair of large-size glass substrates so that the substrates face each other, attaching the substrates to each other with seal agent, enclosing a liquid crystal layer at a predetermined position between these large-size substrates to form a board device, and cutting out the board device along predetermined parting lines, that is, cut lines by a board cutting device as disclosed in Japanese Laid-Open Patent Publication No. 2002-250912, for example.

However, in the above-described board device, cutting margins are formed on each large-size substrate so as to surround the liquid crystal cells. Therefore, when a plurality of liquid crystal cells are formed in a matrix form on the board device, the respective liquid crystal cells must be arranged so as to be spaced from one another by the amount corresponding to each cutting margin. Therefore, the above-described board device has a problem that it is not easy to improve the built-in number of display elements for the liquid crystal panel.

Furthermore, when the respective liquid crystal cells are cut out, the cut-out frequency of the large-size substrate is increased by the amount corresponding to the cutting margins of each large-size substrate, and thus the manufacturing performance is unsatisfactory.

The present invention has been implemented in view of the foregoing points, and has an object to provide a board device and a method for manufacturing a display element that can improve the manufacturing performance and the built-in number of display elements.

SUMMARY OF THE INVENTION

According to the present invention, in a board device having a first substrate and a second substrate disposed so as to face the first substrate, and a plurality of display elements being provided so as to be adjacent to one another at least in a predetermined direction, and separable from one another, each of the display elements is equipped with a display area, a non-display area provided at the predetermined direction side of the display area, and a plurality of terminal pads that are provided for the first substrate located in the non-display area and electrically connected to the display area side, and the board device includes pillar-shaped spacers each of which is disposed at the position between the boundary line of display elements adjacent to each other in the predetermined direction and each terminal pad in connection with the arrangement of at least some of the terminal pads so as to be interposed between the first substrate and the second substrate. The pillar-shaped spacers are disposed at the positions between the boundary lines of the display elements adjacent to each other in the predetermined direction and the terminal pads in connection with the arrangement of at least some of the terminal pads so as to be interposed between the first substrate and the second substrate. Accordingly, even when the respective display elements are separated from one another along the boundary line between the display elements adjacent to each other in the predetermined direction, exfoliation of the terminal pads can be prevented by the pillar-shaped spacers, and thus extra cutting margins can be reduced between the adjacent display elements, and thus the manufacturing performance and the built-in number of the display elements can be enhanced.

DETAILED DESCRIPTION OF THE PREFERRED EMBODIMENTS

The construction of a board device according to a first embodiment of the present invention will be described with reference to FIGS. 1 to 4.

Figure 1:
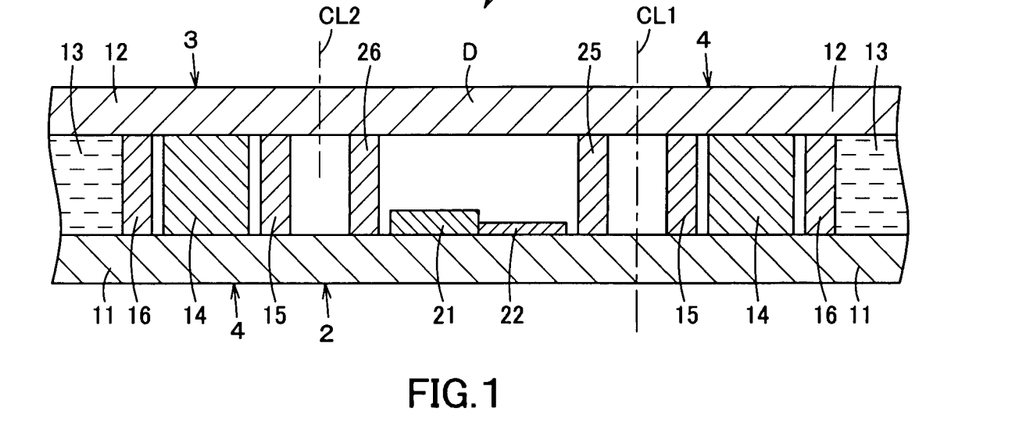
FIG. 1 is a cross-sectional view showing a part of a board device according to a first embodiment of the present invention.
Figure 2:
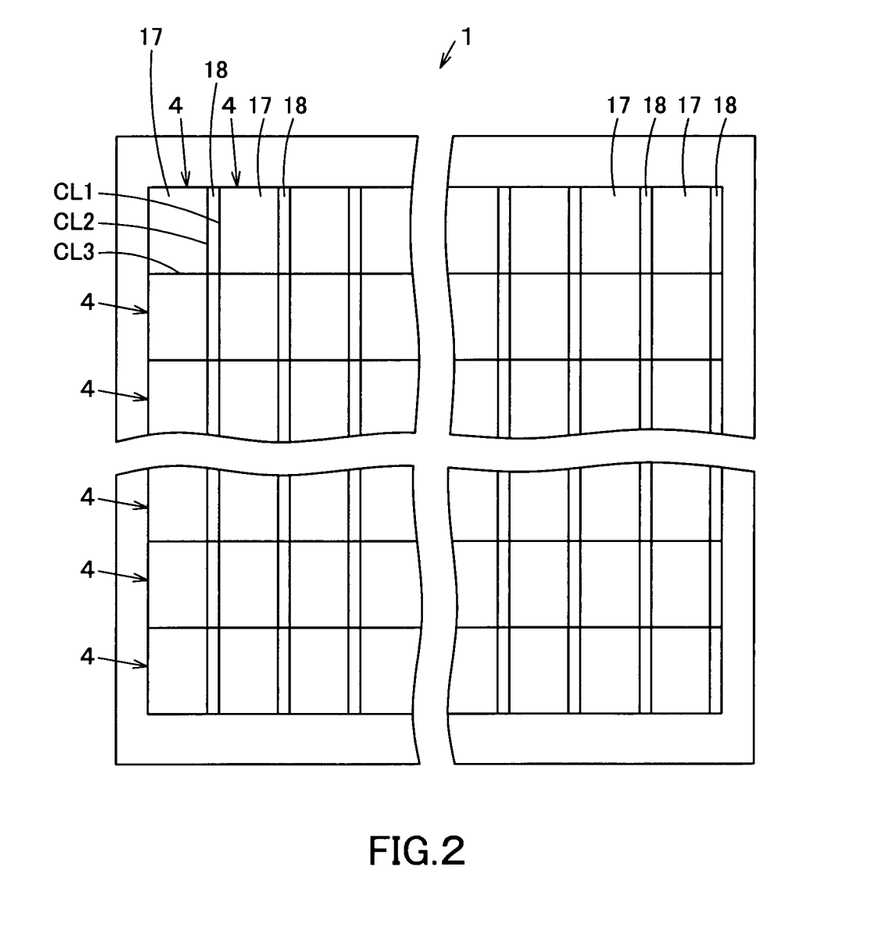
FIG. 2 is a plan view showing the board device.
Figure 3:
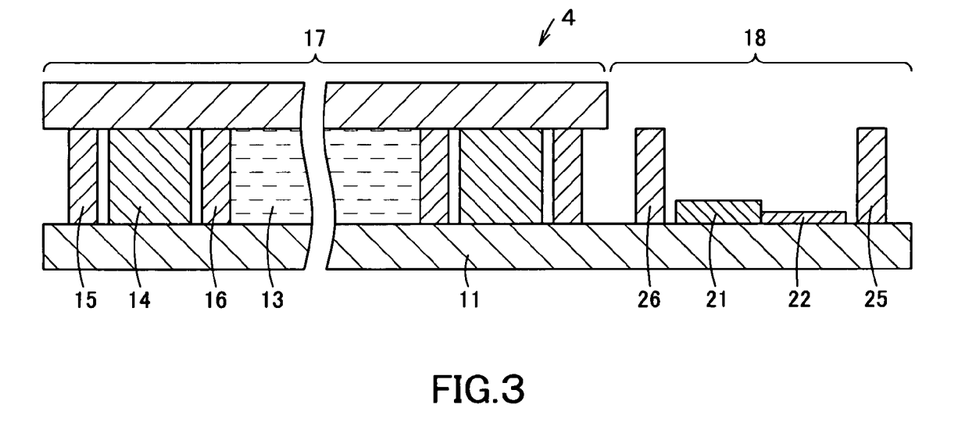
FIG. 3 is a cross-sectional view showing a display element on the board device.

In FIGS. 1 to 3, 1 represents a board device, and the board device is constructed by disposing a first large-size substrate 2 formed of a glass substrate as a first substrate and a second large-size substrate 3 formed of a glass substrate as a second substrate so that these substrates face each other. A plurality of liquid crystal cells 4 formed of liquid crystal display elements as display elements are formed in a matrix form, and these liquid crystal cells 4 can be separated from one another.

Here, each liquid crystal cell 4 is designed as an active matrix type, and it is equipped with an array substrate 11 as a glass substrate cut out from the first large-size substrate 2, a counter substrate 12 as a glass substrate cut out from the second large-size substrate 3 and a liquid crystal layer 13 interposed between the array substrate 11 and the counter substrate 12. Furthermore, a seal member 14 such as UV curable resin or the like for adhesively attaching the array substrate 11 (the first large-size substrate 2) and the counter substrate 12 (the second large-size substrate 3) to each other is disposed around the periphery of the liquid crystal layer 13, and pillar-shaped spacers 15 and 16 as spacing members for keeping the spacing between the array substrate 11 and the counter substrate 12 are disposed outside and inside the seal member 14. In each of the liquid crystal cells 4, a display area 17 having pixels (not shown) arranged in a matrix form to display an image and a non-display area 18 in which various kinds of circuits for controlling the operation of the display area 17 are formed.

A plurality of signal lines and a plurality of scan lines (not shown) are arranged in a grid form at the position corresponding to the display area 17 on one principal surface of the array substrate 11, and thin film transistors (TFT) as switching elements for driving the respective pixels are arranged at the cross positions of the signal lines and the scan lines. These thin film transistors are electrically connected to the various kinds of circuits of the non-display area 18 via the signal lines and the scan lines. Various kinds of insulating film, and pixel electrodes constituting the pixels, orientation film, etc., which are not shown, are laminated at the position corresponding to the display area 17 of the array substrate 11.

The counter substrate 12 is formed so as to be smaller than the array substrate 11 in plan view, and a color filter (not shown), orientation film, etc., which are not shown, are laminated on one principal surface of the array substrate 11 side. Therefore, the position at which the counter substrate 12 does not face the array substrate 11 serves as the non-display area 18.

The pillar-shaped spacers 15 and 16 are formed, for example, of synthetic resin having translucency in a pillar-shape.

The non-display area 18 is provided with a plurality of driver ICs 21 as driving means that are electrically connected to TFTs at the display area 17 side through the signal lines or the scan lines to drive TFTs, and a plurality of OLB (Outer Lead Bonding) terminals 22 as terminal pads are electrically connected to the driver ICs 21 with wirings 23 formed on the array substrate 11.

Figure 4:
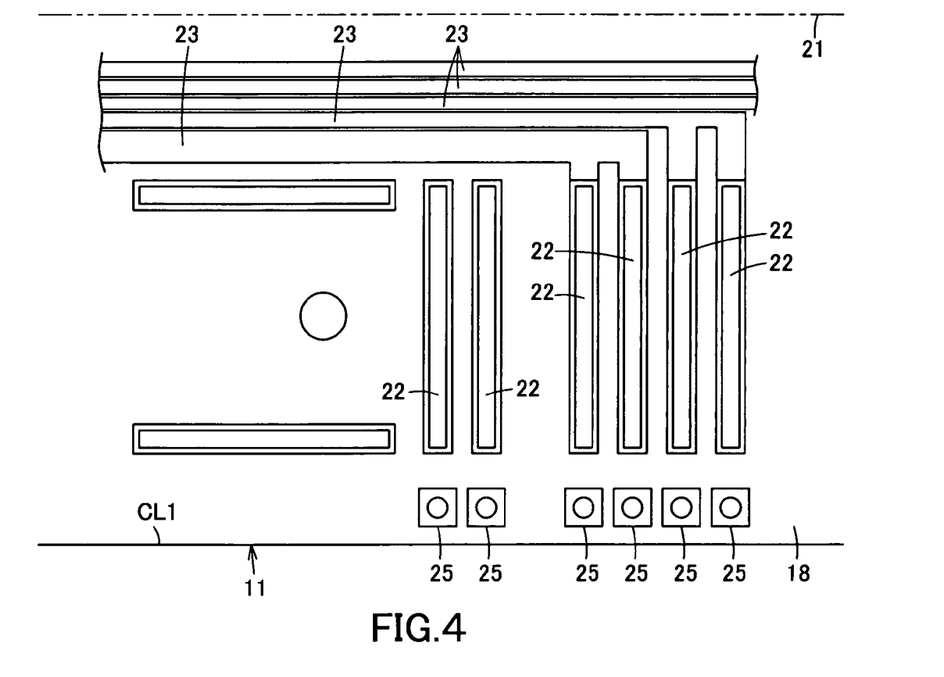
FIG. 4 is a plan view showing a part of the board device.

As shown in FIG. 4, the OLB terminals 22 are formed of ITO or the like so as to extend from the driver IC 21 side to the end portion side of the display area 17 in an elongated shape, and arranged parallel with one another in a direction crossing the longitudinal direction. The OLB terminals 22 are bonded to a flexible substrate having flexibility such as polyimide tape or the like under thermocompression by anisotropic conductive film, that is, ACF (Anisotropic Conductive Film), whereby the circuits mounted on the flexible substrate and the driver ICs 21 can be electrically and mechanically connected to each other.

A plurality of pillar-shaped spacers 25 are formed in the vicinity of the OLB terminals 22 in the non-display area 18, and a plurality of pillar-shaped spacers 26 are formed in the non-display area 18 so as to be in the vicinity of the display area 17. As with the pillar-shaped spacers 15 and 16, these pillar-shaped spacers 25, 26 are formed of synthetic resin having translucency or the like in a pillar-shape on the first large-size substrate 2, and interposed between the first large-size substrate 2 and the second large-size substrate 3.

Furthermore, each pillar-shaped spacer 25 is disposed in connection with the position of each OLB terminal 22 and faces the end portion of each OLB terminal 22 between the OLB terminal 22 and the end portion of the array substrate 11.

The respective liquid crystal cells 4 are formed in the board device 1 so that the display area 17 of one liquid crystal cell 4 is adjacent to the non-display area 18 of another liquid crystal cell 4 adjacent to the liquid crystal cell 4 concerned in a predetermined direction, for example, in the right-and-left direction of FIG. 2, and separated from the board device 1 at the cut line positions by a substrate cut device (not shown).

Here, the cut lines have cut lines CL1 formed on the first large-size substrate 2 and the second large-size substrate 3 along the boundary lines of the adjacent liquid crystal cells 4 and 4 in the right-and-left direction of FIG. 2, cut lines CL2 formed on the second large-size substrate 3 in connection with the non-display areas 18 so as to expose the non-display areas 18, and cut lines CL3 formed on the first large-size substrate 2 and the second large-size substrate 3 along the boundaries of the adjacent liquid crystal cells 4 and 4 in the up-and-down direction of FIG. 2.

Accordingly, each cut line CL1 is formed substantially at the middle position between the pillar-shaped spacers 25 and 15, each cut line CL2 is formed substantially at the middle position between the pillar-shaped spacers 26 and 15, and each cut line CL3 is formed substantially at the middle position between the pillar-shaped spacers 15 and 15.

The second large-size substrate 3 between the cut lines CL1 and CL2 is set as a cutting margin D when the liquid crystal cells 4 are cut out.

Next, a method for manufacturing the first embodiment will be described.

First, the thin film transistors, the signal lines, the scan-lines, various kinds of insulating film, the pixel electrode, the orientation film, the OLB terminals 22, the pillar-shaped spacers 15, 16, 25, and 26, etc., are laminated at predetermined positions on the first large-size substrate 2.

At this time, the respective pillar-shaped spacers 25 are formed so as to face the end portions of the respective OLB terminals 22.

Subsequently, the seal member 14 is coated, the second large-size substrate 3 on which the color filter, the orientation film, etc., are laminated is disposed so as to face the first large-size substrate 2, and then ultraviolet rays or the like is irradiated to the seal member 14 through a predetermined mask or the like to thereby cure the seal member 14.

Thereafter, liquid crystal material is injected from an injection port provided at a predetermined position of the seal member 14 to form the liquid crystal layer 13, and also the injection port is closed to seal the liquid crystal layer 13.

Furthermore, the liquid crystal cells 4 are cut out from the board device 1 under the state that the boundary lines of the liquid crystal cells 4 adjacent in the right-and-left direction of FIG. 2 are set as the cut lines CL1, the boundary lines of the liquid crystal cells 4 adjacent in the up-and-down direction of FIG. 2 are set as the cut lines CL3, and the gaps between the pillar-shaped spacers 25 and 15 of the second large-size substrate 3 are set as the cut lines CL2.

At this time, the second large-size substrate 3 between the cut lines CL1 and CL2 is set as a cutting margin D, and the pillar-shaped spacers 25 and 26 remain in the non-display area 18.

The driver ICs 21 are mounted on the array substrate 11, and the flexible substrate is adhesively attached to the respective OLB terminals 22 by ACF to complete the liquid crystal cells 4.

As described above, in the first embodiment, the pillar-shaped spacers 25 are disposed at the position between the OLB terminal 22 of the non-display area of the liquid crystal cell 4 and the boundary line of the liquid crystal cells 4 and 4 adjacent in the right-and-left direction of FIGS. 1 and 2 in connection with the arrangement of the OLB terminal 22 so as to be interposed between the first large-size substrate 2 and the second large-size substrate 3.

Therefore, the large-size substrates 2 and 3 can be stably cut along the cut lines CL1 by the pillar-shaped spacers 25, and the OLB terminals 22 can be prevented from being exfoliated in the cutting process. Therefore, extra cutting margins around the liquid crystal cells 4 can be reduced, and the liquid crystal cells 4 and 4 adjacent in the right-and-left direction shown in FIGS. 1 and 2 can be cut out at the boundary lines between these liquid crystal cells 4 and 4. Accordingly, the liquid crystal cells 4 can be arranged so as to be close to one another in the right-and-left direction in the strip-shaped portions adjacent in the right-and-left direction, the built-in number of the liquid crystal cells 4 from the board device 1 can be enhanced, and the liquid crystal cells 4 and 4 adjacent in the right-and-left direction can be separated at the cut line CL1 by one cut. Therefore, the cut-out frequency, that is, the cut number can be suppressed as compared with the conventional art in which cutting margins occur around the liquid crystal cells 4, and the manufacturing performance can be improved.

Furthermore, if a space for arranging a crank-shaped pattern which has been conventionally provided to prevent exfoliation of the OLB terminals on the cut lines in the cutting process is used as the arrangement space of the pillar-shaped spacers 25, it would be unnecessary to newly secure an arrangement space for the pillar-shaped spacers 25, and thus the liquid crystal cell 4 can be prevented from being needlessly larger.

Still furthermore, by arranging the pillar-shaped spacers 25 so that the pillar-shaped spacers 25 face the end portions of the respective OLB terminals 22, the exfoliation of the OLB terminals 22 when the liquid crystal cells 4 are cut from the cut lines CL1, etc., can be reliably prevented.

The pillar-shaped spacers 25 can be formed simultaneously with the other pillar-shaped spacers 15, 16, and 26, and thus a process of newly manufacturing only the pillar-shaped spacers 25 is not required, so that the manufacturing performance is not lowered.

Furthermore, the pillar-shaped spacers 25 and 15 are arranged substantially at equal intervals with respect to the cut line CL1, and thus when the liquid crystal cells 4 are cut along the cut line CL1, the force is substantially equally received by the pillar-shaped spacers 25 and 15, and thus the liquid crystal cells 4 can be stably cut.

Figure 5:
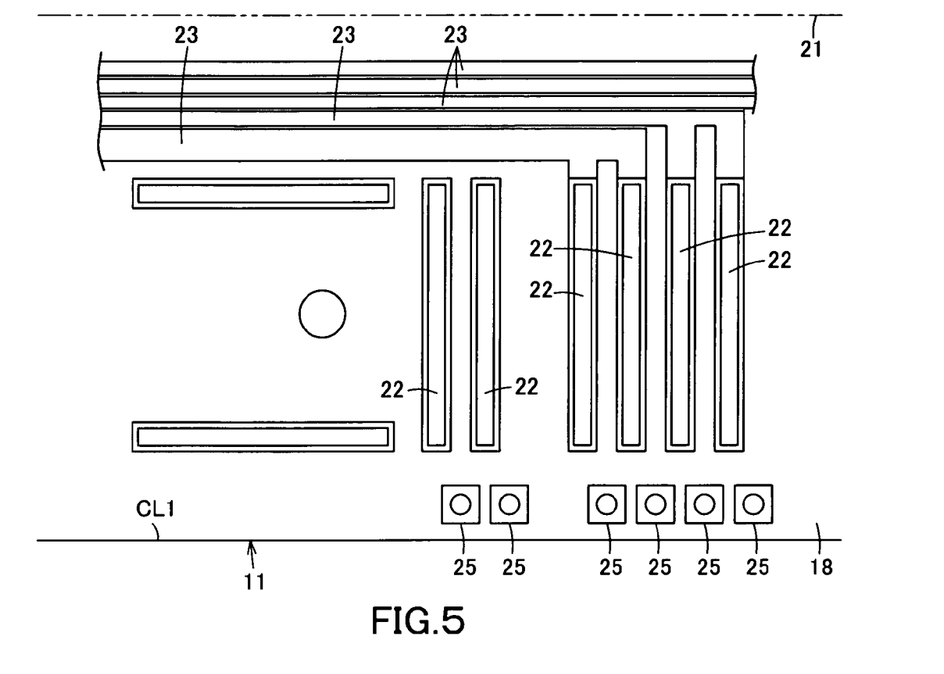
FIG. 5 is a plan view showing a part of the board device according to a second embodiment of the present invention.

Even when the pillar-shaped spacers 25 are arranged between the OLB terminals 22 and 22 in the first embodiment described above as in the case of the second embodiment shown in FIG. 5, the same operation and effect as the first embodiment can be achieved.

Figure 6:
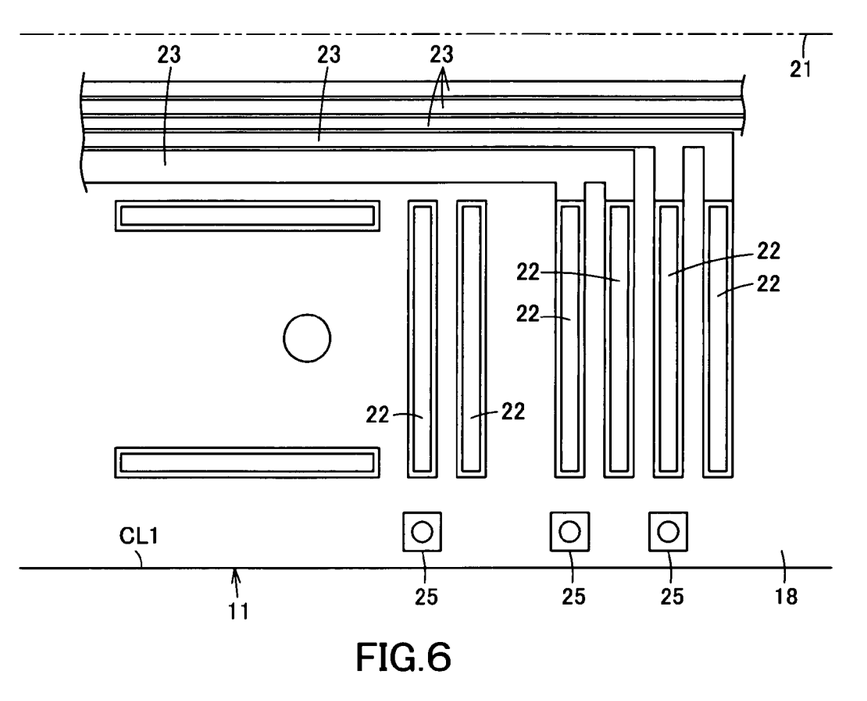
FIG. 6 is a plan view showing a part of the board device according to a third embodiment of the present invention.
Figure 7:
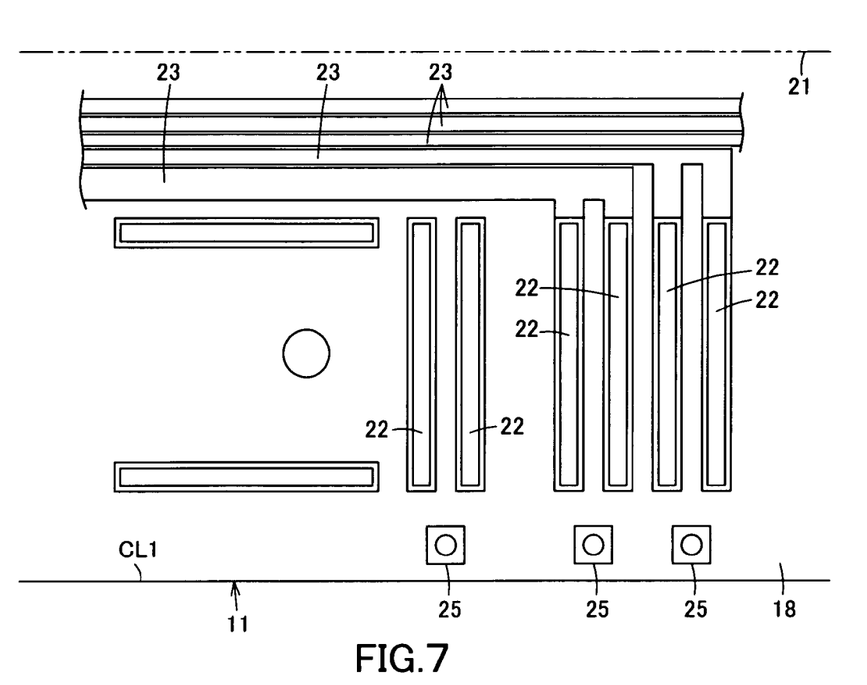
FIG. 7 is a plan view showing a part of the board device according to a fourth embodiment of the present invention.

Furthermore, the same operation and effect as each above-described embodiment can be achieved even by the construction that the pillar-shaped spacers 25 are arranged so as to face the OLB terminals 22 every plurality of OLB terminals 22, for example, every two OLB terminals 22 as in the case of a third embodiment shown in FIG. 6, or by the construction that the pillar-shaped spacers 25 are arranged between the OLB terminals 22 and 22 every plurality of OLB terminals, for example, every two OLB terminals 22 as in the case of a fourth embodiment shown in FIG. 7, and also the number of the pillar-shaped spacers 25 can be reduced, so that the manufacturing performance can be improved.

Figure 8:
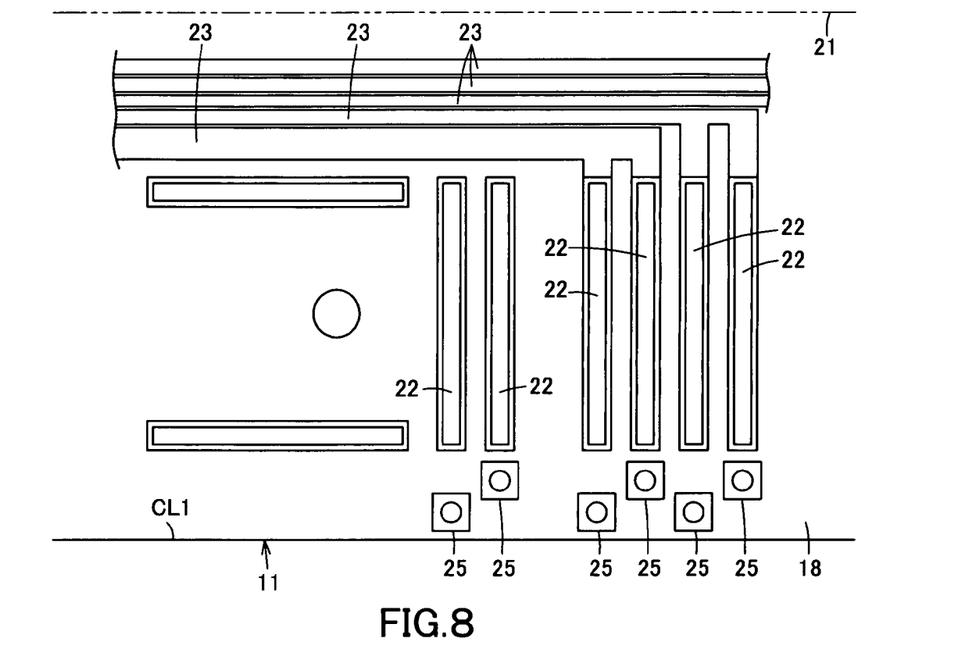
FIG. 8 is a plan view showing a part of the board device according to a fifth embodiment of the present invention.
Figure 9:
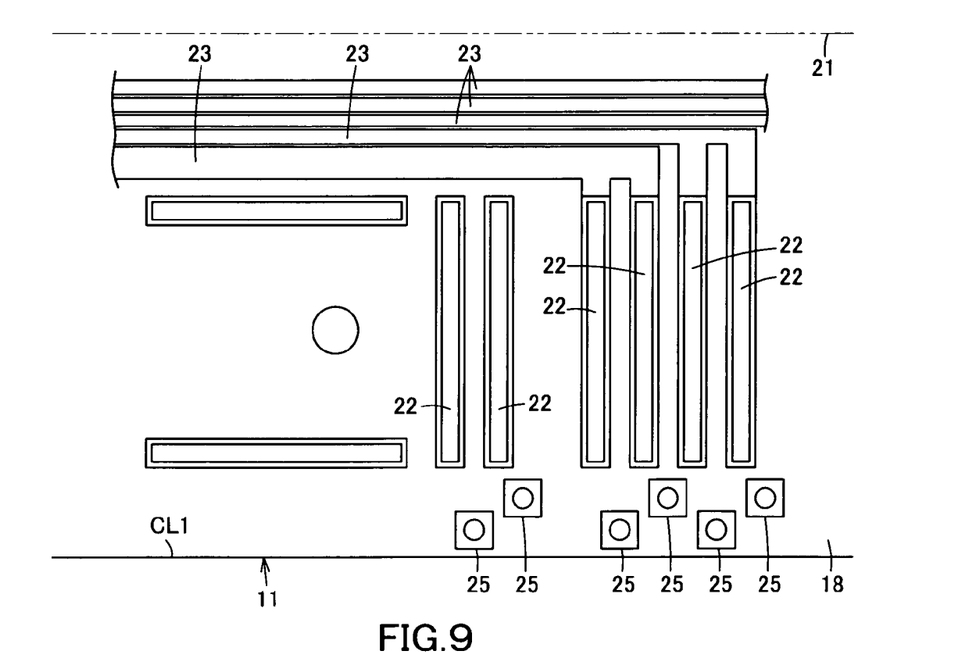
FIG. 9 is a plan view showing a part of the board device according to a sixth embodiment of the present invention.

The same operation and effect as each above-described embodiment can be achieved even by the construction that the respective pillar-shaped spacers 25 of the first embodiment are arranged so as to be alternately displaced from one other in the up-and-down direction of the figure every OLB terminal 22 as in the case of a fifth embodiment shown in FIG. 8, or by the construction that the respective pillar-shaped spacers 25 according to the second embodiment are arranged so as to be alternately displaced from one another in the up-and-down direction of the figure every OLB terminal 22 as in the case of a sixth embodiment shown in FIG. 9. In addition, a large arrangement space of the pillar-shaped spacers 25 can be secured, and also the holding strength of the second large-size substrate 3 by the pillar-shaped spacers 25 can be further improved.

Figure 10:
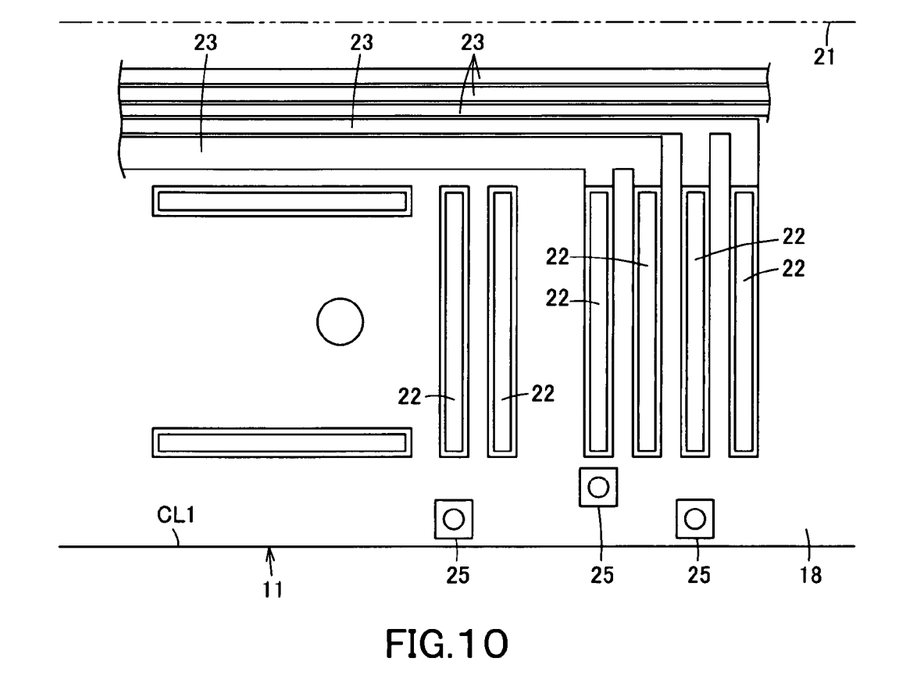
FIG. 10 is a plan view showing a part of the board device according to a seventh embodiment of the present invention.
Figure 11:
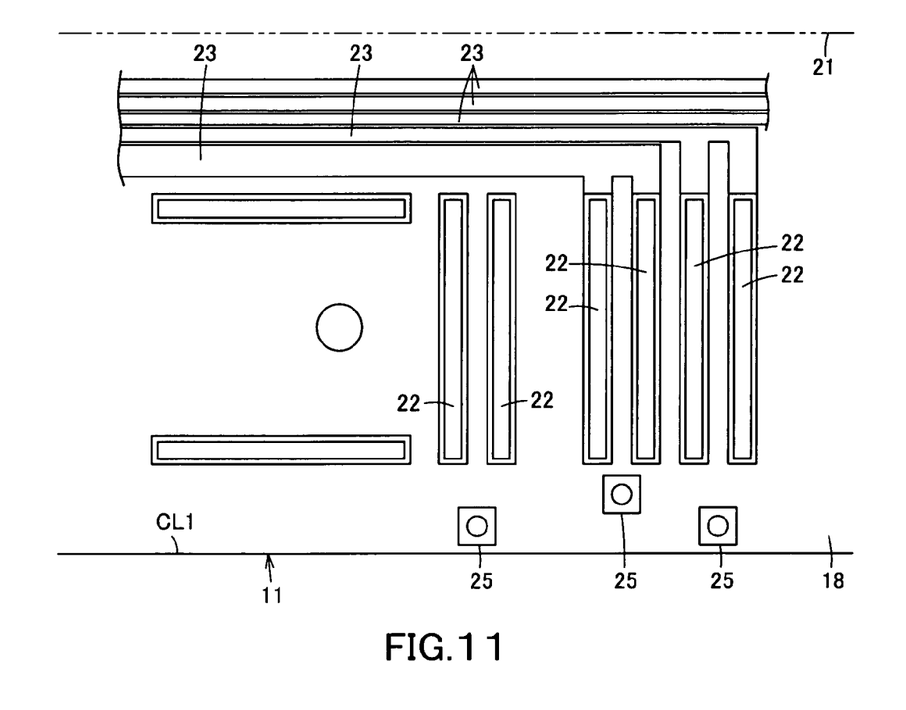
FIG. 11 is a plan view showing a part of the board device according to an eighth embodiment of the present invention.

Likewise, the same operation an effect as each above-described embodiment can be achieved even by the construction that the respective pillar-shaped spacers 25 of the third embodiment are arranged so as to be displaced from one another in the up-and-down direction of the figure as in the case of a seventh embodiment of FIG. 10, or by the construction that the respective pillar-shaped spacers 25 of the fourth embodiment are arranged so as to be alternately displaced from one another in the up-and-down direction of the figure.

Furthermore, in each above-described embodiment, the non-display area 18 is formed only at the right side shown in FIG. 1 and FIG. 2 of the display area 17. However, it is a matter of course that the same operation and effect can be achieved by likewise arranging the pillar-shaped spacers 25 even when the non-display area 18 is formed in an L-shape in plan view along one side of the display area 17 and another side adjacent to the one side concerned, or around the display area 17.

Still furthermore, the pillar-shaped spacers 25 may be provided at the counter substrate 12 (second large-size substrate 3) side. In this case, the pillar-shaped spacers 25 are discarded at the same time when the cutting margins D are discarded.

Even when various display elements other than the liquid crystal cells 4 are separated from the board device 1, the same construction can be applied.

What is claimed is:

1. A board device having a first substrate and a second substrate disposed so as to face the first substrate, and a plurality of display elements adjacent to one another at least along a predetermined direction, and separable from one another, wherein
each of the display elements comprises:
a display area,
a non-display area provided along the predetermined direction and adjacent to the display area, and
a plurality of terminal pads in the non-display area on the first substrate and electrically connected to the display area; and
the board device includes pillar-shaped spacers disposed in the non-display area between a boundary line of the display elements and the terminal pads and disposed between the first substrate and the second substrate, so that a cutting margin of the first substrate is not required.

2. The board device according to claim 1, wherein each pillar-shaped spacer is disposed to face one of the terminal pads.

3. The board device according to claim 1, wherein each pillar-shaped spacer is disposed to face a location between two of the adjacent terminal pads.

4. The board device according to claim 1, wherein each pillar-shaped spacer is disposed for every at least two of the plurality of terminal pads.

5. A display element manufacturing method of separating display elements from a board device having a first substrate, a second substrate disposed so as to face the first substrate, and a plurality of display elements adjacent to one another at least along a predetermined direction, each of the display elements comprising a display area, a non-display area provided along the predetermined direction and adjacent to the display area, and a plurality of terminal pads in the non-display area on the first substrate and electrically connected to the display area, the method comprising:

provided a pillar-shaped spacer disposed in the non-display area between a boundary line of the non-display area of one of the display elements and the display area of an adjacent one of the display elements, and the terminal pads, and between the first substrate and the second substrate, so that a cutting margin of the first substrate is not required, and separating the display elements along the boundary line.

6. The display element manufacturing method according to claim 5, wherein the pillar-shaped spacer is disposed to face one of the terminal pads.

7. The display element manufacturing method according to claim 5, wherein the pillar-shaped spacer is disposed to face a location between two of the adjacent terminal pads.

8. The display element manufacturing method according to claim 5, wherein the pillar-shaped spacer is disposed for at least two of plurality of terminal pads.

* * * * *